United States Patent [19]

Markou

[11] Patent Number: 5,282,445

[45] Date of Patent: Feb. 1, 1994

[54] DEVICE FOR INSERTING RARE EARTH PARTICLES INTO A COMBUSTION CHAMBER

[76] Inventor: Miltiathis Markou, P.O. Box 21557, Griechenland, Greece

[21] Appl. No.: 834,533

[22] PCT Filed: May 17, 1991

[86] PCT No.: PCT/EP91/00927

§ 371 Date: Mar. 10, 1992

§ 102(e) Date: Mar. 10, 1992

[87] PCT Pub. No.: WO91/19896

PCT Pub. Date: Dec. 26, 1991

[30] Foreign Application Priority Data

Jun. 12, 1990 [DE] Fed. Rep. of Germany ....... 4018797

[51] Int. Cl.$^5$ .................................................. F02B 77/00
[52] U.S. Cl. .................................... 123/198 A; 123/1 A
[58] Field of Search ............................ 123/1 A, 198 A

[56] References Cited

U.S. PATENT DOCUMENTS

| 1,230,654 | 6/1917 | Berry | 123/198 A |
| 2,818,416 | 12/1957 | Brown et al. | 123/1 A |
| 2,935,975 | 5/1960 | Sandy et al. | 123/1 A |

*Primary Examiner*—Noah P. Kamen
*Attorney, Agent, or Firm*—Rogers & Killeen

[57] ABSTRACT

A device for introducing a small amount of a rare earth mixture or composition in the combustion chamber of an combustion engine (1) comprises a container (4) containing a dry, air-permeable filling (5) of rare earth-containing fibers and/or powder, wherein the container (4) communicates via an opening (11) with the atmosphere and via a suction line (8) with a vacuum line (2), which is connected to the combustion chamber of the engine (1).

26 Claims, 2 Drawing Sheets

DEVICE FOR INSERTING RARE EARTH PARTICLES INTO A COMBUSTION CHAMBER

BACKGROUND OF THE INVENTION

The present invention is directed to a device for inserting a small amount of a rare earth containing mixture or composition into a combustion chamber, particularly the combustion chamber of an internal combustion engine with spark ignition or compression ignition.

Such a device is known from DE-A 29 32 603. In the known device a rare earth metal composition finely dispersed in an aqueous solution is inserted in the air intake manifold of an internal combustion engine.

The problem underlying the invention is to provide a device of simple design and structure, by which a rare earth mixture or composition may be continuously introduced in small amounts during a long operation period without or with minimum of maintenance on the combustion chamber of an internal combustion engine.

The present invention includes a container, which has an air-permeable dry filling of rare earth fibers and/or rare earth powder, that communicates via an opening with the atmosphere, and that communicates via a suction connection or line with either a vacuum line, or directly with the combustion chamber of the engine.

Preferably the opening to the atmosphere is formed by one end of a tube, which communicates with the filling via at least one orifice, wherein an air filter may be arranged within the tube adjacent the opening and wherein a throttle is arranged downstream of the air filter within the tube.

In a device of the invention a pressure below the atmospheric pressure is induced by means of the vacuum line into the tube. Thereby air is sucked from the container via the orifice, which conveys a small amount of particles of the filling via the tube and the vacuum line into the combustion chamber.

A filter, which may be arranged in the flow-path between the orifice and the filling, acts as a flowbarrier to finely divide the particles to be sucked into the tube and to thereby determine an enlarged surface,—the filter surface facing the filling—for sucking in the particles into the tube. This avoids undue localizing and the risk of clogging. The filter is preferably formed as a filter screen in a cylindrical shape which is arranged transversely to the tube and communicates with its one end or "foot" with the orifice in the tube.

The container may be dimensioned for a filling which is sufficient for the whole lifetime of the internal combustion engine. Alternatively, as the space in modern automobiles is limited, a container dimensioned for a filling sufficient for a restricted operation time, e.g. corresponding to 80,000 km running distance for a passenger car, may be installed.

The container may be arranged removably in the engine compartment of an automobile to be exchanged against a fresh container in the latter case. The container may also have a refilling opening for renewal of the filling.

The device of the invention enables to add a small amount of a rare earth mixture or composition in a dry state to the air intake of an internal combustion engine avoiding the carrying and filling of a solvent, thereby avoiding the necessity of regularly refilling solvent after short time periods and/or additional space necessary for a solvent container in the automobile.

The filling is preferably in fibrous and/or powder form. The following two viewpoints should govern the selection of the filling to be used in the invention:

1. The particle size of the materials ranges from 0.25 mm (60 mesh) down to as low as 0.5 micron, with the size of 0.048 mm (300 mesh) representing a preferred size.
2. In even more general terms, it should be understood that the used compositions should contain a percentage of cerium ($Ce\ O_2$) as high as can readily and economically be achieved, this in view, of course, of the practical difficulties involved in separating the various rare earth oxides.

Principally the cerium content, by weight in the mixture varies from 30% up to practically 100%. Three examples for preferred compositions are given in the following specific description.

By introducing a small amount of the mixture into the air intake, the harmful pollutants, particularly that of $CO$, $CO_2$, $HC$ and $NO_x$ are reduced, and the combustion is improved so that an effect comparable to that of a controlled catalytic converter is achieved, but at much less expenditure.

It is an important advantage of a device of the invention that it can be fitted to existing automobiles even when driven by engines using unleaded fuel. Of course, the device may be used in engines driven by any other conventional fuels for internal combustion engines.

The vacuum line might be the intake manifold of the engine. It is, however, also possible to directly connect the suction line with the combustion chamber. In that case a check valve must be provided in order to ensure, that the container communicates with the combustion chamber solely during the intake period of the engine.

The device of the invention may likewise be applied in spark ignition or compression ignition engines and also in stationary internal combustion engines.

Particularly in applications for large combustion engines, like locomotive- ship- or stationary engines it is preferred to transport the rare earth particles by a motor-driven conveying means in the vicinity of a suction opening of the suction line.

DESCRIPTION OF THE DRAWINGS

The invention is described in the following with reference to the enclosed drawings of embodiments of the invention in more detail.

FIG. 3 is a perspective view of a mounting bracket for mounting the device of FIG. 2 at a housing wall in a motor compartment of a vehicle or the like;

DESCRIPTION OF PREFERRED EMBODIMENTS

Figure 1:
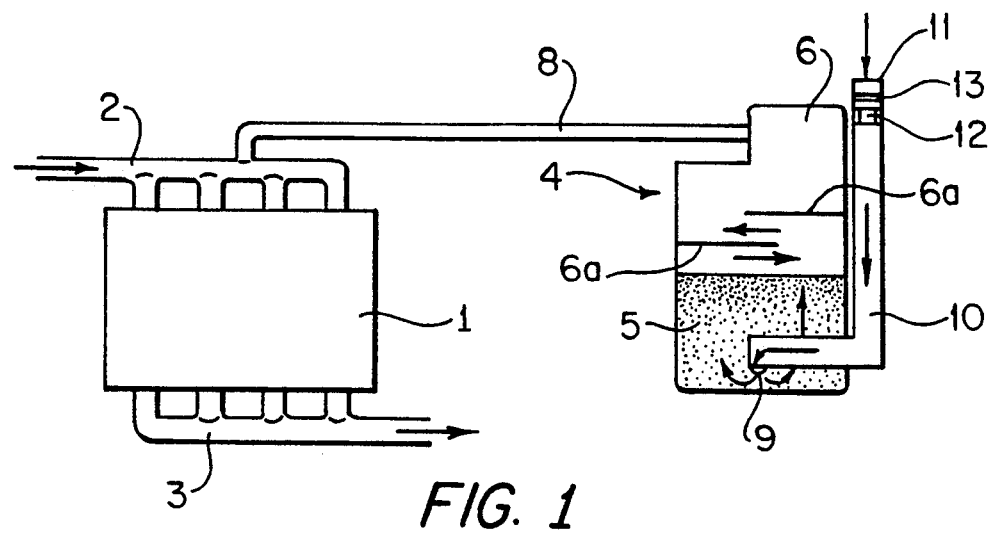
FIG. 1 is a diagram showing an arrangement of the first embodiment of the device according to the invention connected to the intake manifold of an internal combustion engine.

In FIG. 1 an internal combustion engine 1 has an intake manifold 2 and an exhaust manifold 3.

A container 4 contains an air-permeable filling 5 of a rare earth oxide-mixture in fibrous or powder form. A space 6 above the filling in the container has at least one flow barrier 6a and communicates via suction line 8 with air intake manifold 2. A tube 10, which is fixed to the container and has a lower end extending inside the container and filling 5, has an orifice 9 at the inside end of the tube communicating with the filling 5 near the bottom of the container 4 and an upper end with an opening 11 to the atmosphere. Downstream of the opening 11 an air filter 13 and a throttle 12 is built in the tube 10. Atmospheric air sucked via the suction line 8 enters the opening 11 and flows via the throttle bore 12, the tube 10 and the orifice 9 into the filling 5, passes said filling and the flow barrier 7, where a turbulent motion is imparted to the air such that rare earth oxide-particles are taken up by the air and conveyed through the suction line 8 in the air intake manifold 2 and thereupon into the combustion chambers of the cylinders of the internal combustion engine. The container 4 may be exchanged after an operation period of the engine corresponding to e.g. 80,000 km against a freshly filled container. Alternatively, the container 4 may be recharged through a refilling opening, not shown.

Instead of the air intake manifold 2 any other vacuum line which communicates with the combustion chamber, can be chosen for the transport of air through the filling 5, for instance the vacuum line of a carburetor, a vacuum line of fuel injection system, an air-fuel-mixture-intake line etc. To enable an economic operation it is preferred that no additional energy is used for the transport of air through the container and into the combustion chamber, but the flow energy, which is produced and available anyway in an internal combustion engine.

Figure 2:
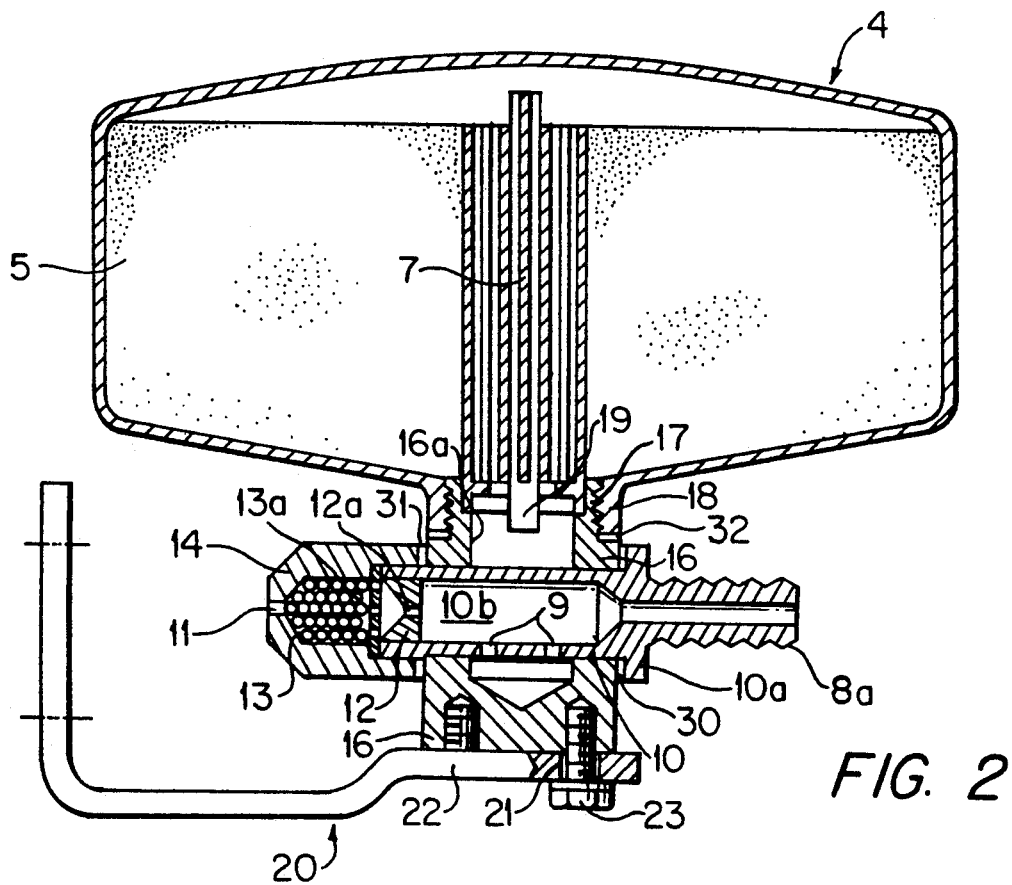
FIG. 2 is a sectional view of another embodiment of the invention in more detail.

In FIG. 2 same parts or parts having a similar effect than those in FIG. 1 are designated by the same reference numerals.

With reference now to FIG. 2, a tube 10 is inserted into a base 16 and fixed thereto by a screw cap 14 which forms an air filter housing for enclosing a filter material 13 (filter carbon grains) in cooperation with a filter screen 13a. The screw cap 14 clamps a flange 10a of the tube 10 against base 16. Between base 16 and flange 10a on the one hand and screw cap 14 and base 16 on the other hand annular seals 30, 31 are inserted. An opening 11 in the screw cap 14 accomplishes communication between the ambient atmosphere and an inner space 10b of the tube 10 via a throttle 12, which is press-fitted into the end of the tube and has a throttle bore 12a, the diameter of which is e.g. 0.5 mm. Variation in filling charge consumed is governed by the air stream sucked through opening 11 and throttle bore 12a.

On its upper end the base 16 has a threaded connecting piece 17, on which a threaded boss 18 at the bottom end of the container 4 is screwed. In a blind bore 16a inside of the connecting piece 17 of base 16, the bottom end 19 of a cylindrically shaped filter screen 7 is inserted, said filter screen 7 passing through the total depth or thickness of filling 5. The filter screen 7 controls the flow of air and filling particles through bore 16a in base 16 and further through two orifices 9 into tube 10, which is connected through a suction projection 8a to suction line 8, which in this case might be formed by a flexible hose, not shown. Thus, when applying a pressure, which is lower than the atmospheric pressure, via suction projection 8a air containing a small amount of rare earth oxide particles will be sucked from filling 5 in container 4 through filter screen 7, blind bore 16a, orifices 9 and tube inner space 10b into the suction projection 8a and from there according to FIG. 1 into the intake manifold 2 or directly into the combustion chamber of the engine 1.

The following analyses give the compositions by weight of three examples of preferred mixtures to be used as fillings 5 in the invention.

| Composition 1 | |
| --- | --- |
| cerium oxide | 45.0% |
| lanthanum oxide | 22.5% |
| neodymium oxide | 17.9% |
| praesodynium oxide | 5.7% |
| thorium oxide | 0.25% |
| sulfate as SO$_3$ | 1.5% |
| other oxides (YO$_{23}$, ScO$_3$) | 2.9% |
| phosphate as PO$_3$ | 0.8% |
| lime and magnesia | 1.0% |
| Composition 2 | |
| cerium oxide | 90.0% |
| lanthanum oxide | 2.0% |
| neodymium oxide | 1.3% |
| praesodynium oxide | 0.4% |
| other rare earth oxides | 1.0% |
| thorium oxide | 0.25% |
| iron oxide and alumina | 0.25% |
| lime and magnesia | 4.0% |
| silica | 0.05% |
| phosphate | 0.5% |
| sulfate | 0.5% |
| Composition 3 | |
| cerium oxide | 45.6% |
| lanthanum oxide | 22.8% |
| neodynium oxide | 16.2% |
| praesodynium oxide | 4.7% |
| other rare earth oxides | 5.7% |
| thorium oxide | 0.2% |
| iron oxide and alumina | 1.0% |
| lime and magnesia | 0.2% |
| silica | 0.1% |
| phosphate | 0.5% |
| sulfate | 1-2.0% |
| loss on ignition | 0-1.0% |

Figure 3:
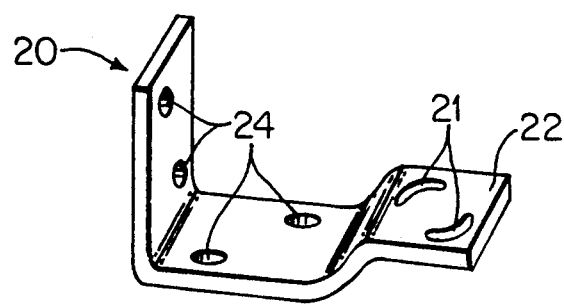

FIG. 3 shows a mounting bracket 20 for adjustable screw connection of the device of FIG. 2 by means of screws 23 (FIG. 2) at a wall (not shown) in the engine compartment of an automobile. The mounting bracket 20 has a cranked supporting portion 22 to support the bottom of base 16. Two slots 21 having the shape of an arc of a common circle are dimensioned to let pass through screws 23, which are screwed into threaded bores at the bottom of base 16. Slots 21 allow for adjustable mounting of the device in desired rotational positions of base 16 and thereby of tube 10, in order to bring the suction projection 8a in a most favourable position for connection to the intake manifold 2.

The amount of the filling 5 is dependent on the size and fuel consumption of the internal combustion engine. Experiments have shown, that in a 1000 ccm-gasoline engine about 1.6 mg/km should be charged to achieve the desired effect of reducing the pollutants sufficiently from the exhaust gas. After a driving distance of about 800 km the benefits of the device is evident and no further increase in benefits would appear to occur.

The device according to the invention may particularly be applied instead of a controlled catalytic converter in internal combustion engines using leaded fuel and in internal combustion engines, in which the use of a controlled catalytic converter would be too expensive.

Figure 4:
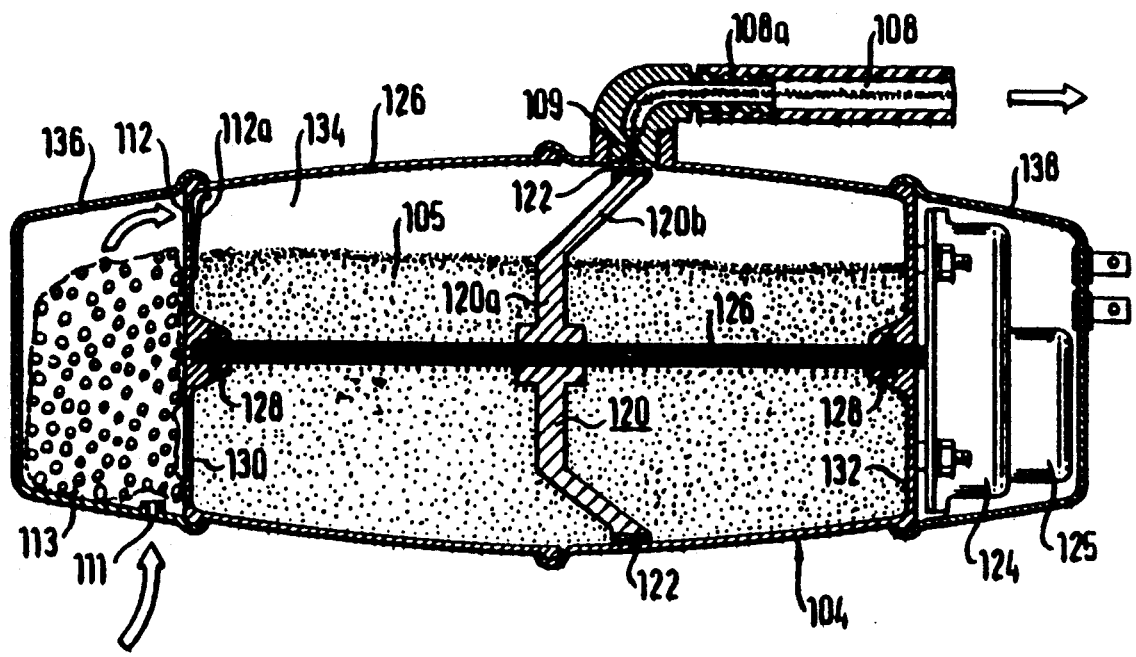
FIG. 4 is a sectional view of still another embodiment.

The embodiment shown in FIG. 4 comprises a container 104, which has a housing part 134 containing a filling 105 of a rare earth powder, an air filter part 136 containing a filter material 113 (e.g. active charcoal grains) or filter mesh and having an opening 111 to the atmosphere, and a driving part 138 housing electric motor 124 with transmission 125. The air filter part 136 and the driving part 138 are each separated from the housing part 134 by partition walls 130, 132, respectively, which comprise bearings 128 for supporting a central shaft 126, which is driven by the motor 124. The inside of parts 134, 136 and 138 normally is under atmospheric pressure. Filter part 136 is connected to housing part 134 by an air opening 112, which might be covered by a membrane 112a, which is urged against the opening 112 by spring force inherent in the membrane. The opening and the cooperating membrane have the effect of a throttling device.

On said central shaft 126 a wheel 120 is fixed, which has a radial part 120a and a conical part 120b. At the outer periphery of said conical part 120b conveying means 122 in the form of shovels or teeth are arranged around the periphery around the wheel 120. Instead of shovels or teeth any other means, for instance roughend surfaces may be provided which are apt to take up rare earth particles from said filling 105 when said wheel 120 travels through said housing part 134 thereby transporting said rare earth particles in the vicinity of a suction orifice 109 which passes through the wall 126 of the container 104 and communicates with a suction line connector 108a for communicating with a suction line 108, for instance a hose as shown in FIG. 4.

When the combustion engine is started, the motor 124 will be activated and thereby rotate shaft 126 and wheel 120 at low speed (e.g. 6 rpm). The conical part 120b acts as a wing or shovel which urges the material to flow from the sides of the wheel 120 to its bottom into a region under the central part of wheel 120 such, that rare earth particles are always conveyed by the conveying means 122 on the periphery of the wheel 120 to a location close to the suction orifice 109 where the particles are taken-up by means of the suction effect within the suction line 108. Thus, under all circumstances it is guaranteed that rare earth particles are delivered within the combustion chambers of the combustion engine.

The embodiment of FIG. 4 is particularly useful in large combustion engines as used in locomotives, ships and as stationary engines of power plants or the like.

What is claimed is:

1. A device for introducing a small amount of particles comprising rare earth elements that include cerium into the combustion chamber of an internal combustion engine, the device comprising a container (4) which has therein said particles in the form of an air-permeable dry filling (5), said container having an opening (11) communicating with the atmosphere and a suction line (8) communicating with one of a vacuum duct (2) that delivers air to the engine, and the combustion chamber of the engine (1).

2. The device of claim 1, wherein the opening (11) to the atmosphere is arranged at one end of a tube (10), which has at least one orifice (9) communicating with the filling (5).

3. The device of claim 2 further comprising a filter (7) between the orifice (9) and the filling (5).

4. The device of claim 3, wherein the communication between the container and the suction line (8) is made via a further opening (at 8a) at the other end of the tube (10).

5. The device of claim 2, wherein the communication between the container and the suction line (8) is made via a further opening (at 8a) at the other end of the tube (10).

6. The device of claim 2 further comprising an air filter (13) between said opening (11) and the interior of said tube (10).

7. The device of claim 6 further comprising a throttle (12) downstream of the air filter (13) in the tube (10).

8. The device of claim 1, wherein the container (4) is arranged removably in the engine compartment of an automobile.

9. The device of claim 8 wherein said container (104) comprises:
   a rotatable wheel (120) that comprises conveying means (120b, 122) for transporting said filling around the periphery of said wheel, said wheel (120) being driven by a motor (124), and
   a suction orifice (109) of the suction line (108) in a wall (126) of said container (104) adjacent the periphery of said wheel.

10. The device of claim 1 wherein the filling (5) is a mixture comprising the following parts by weight:
    about 50% cerium oxide, and 20 to 26% lanthanum oxide.

11. The device of claim 10 wherein said container (104) comprises:
    a rotatable wheel (120) that comprises conveying means (120b, 122) for transporting said filling around the periphery of said wheel, said wheel (120) being driven by a motor (124), and
    a suction orifice (109) of the suction line (108) in a wall (126) of said container (104) adjacent the periphery of said wheel.

12. The device of claim 1 wherein the filling (5) is a mixture comprising 90% cerium oxide by weight.

13. The device of claim 12 wherein said container (104) comprises:
    a rotatable wheel (120) that comprises conveying means (120b, 122) for transporting said filling around the periphery of said wheel, said wheel (120) being driven by a motor (124), and
    a suction orifice (109) of the suction line (108) in a wall (126) of said container (104) adjacent the periphery of said wheel.

14. The device of claim 1 wherein said filling comprises fibers.

15. The device of claim 1 wherein said filling comprises a powder.

16. The device of claim 1 characterized in that the container (4) has a sealingly closed recharge-opening for renewal of the filling (5).

17. The device of claim 1 wherein said container (104) comprises:
    a rotatable wheel (120) that comprises conveying means (120b, 122) for transporting said filling around the periphery of said wheel, said wheel (120) being driven by a motor (124), and
    a suction orifice (109) of the suction line (108) in a wall (126) of said container (104) adjacent the periphery of said wheel.

18. The device of claim 17 wherein said wheel (120) is fixed on a shaft (126) which passes through said container (104) and is supported in bearings (128), which are mounted in bearing shields (130. 132) which form inner partition walls of the container which houses said filling.

19. The device of claim 18 wherein said container (104) comprises:
    an air filter housing located at the outer side of one (130) of said bearing shields and having said opening (111) to the atmosphere, said air filter housing having an opening (112) communicating with said container that houses said filling; and a motor housing (138) at the outer side of the other (132) of the said bearing shields for housing said motor (124) for driving shaft (126).

20. The device of claim 18 wherein said conveying means (122) comprises one of shovels and teeth for taking up a small amount of said filling when said wheel (120) is rotated in said container (134) to bring it in a position adjacent to said suction orifice (109).

21. The device of claim 17 wherein said container (104) comprises:

an air filter housing located at the outer side of one (130) of said bearing shields and having said opening (111) to the atmosphere, said air filter housing having an opening (112) communicating with said container that houses said filling; and a motor housing (138) at the outer side of the other (132) of the said bearing shields for housing said motor (124) for driving shaft (126).

22. The device of claim 21 wherein said conveying means (122) comprises one of shovels and teeth for taking up a small amount of said filling when said wheel (120) is rotated in said container (134) to bring it in a position adjacent to said suction orifice (109).

23. The device of claim 17 wherein said conveying means (122) comprises one of shovels and teeth for taking up a small amount of said filling when said wheel (120) is rotated in said container (134) to bring it in a position adjacent to said suction orifice (109).

24. A device for introducing a rare earth filling into the combustion chamber of an internal combustion engine, the device comprising:

a container holding a dry filling of rare earth particles, said container having an opening to the atmosphere; and a suction line communicating between the particle containing inside of said container and the combustion chamber of an internal combustion engine.

25. The device of claim 24 wherein said suction line communicates with the combustion chamber through a vacuum duct of the internal combustion engine.

26. The device of claim 24 wherein said dry filling comprises at least 45% by weight cerium oxide.

* * * * *